(12) United States Patent
Jang

(10) Patent No.: US 7,034,567 B2
(45) Date of Patent: Apr. 25, 2006

(54) SEMICONDUCTOR DEVICES WITH REFERENCE VOLTAGE GENERATORS AND TERMINATION CIRCUITS CONFIGURED TO REDUCE TERMINATION MISMATCH

(75) Inventor: Seong-jin Jang, Kyungki-do (KR)

(73) Assignee: Samsung Electronics Co., Ltd., (KR)

( * ) Notice: Subject to any disclaimer, the term of this patent is extended or adjusted under 35 U.S.C. 154(b) by 22 days.

(21) Appl. No.: 10/780,057

(22) Filed: Feb. 17, 2004

(65) Prior Publication Data
US 2004/0189343 A1   Sep. 30, 2004

(30) Foreign Application Priority Data
Mar. 25, 2003   (KR) .................. 10-2003-0018471

(51) Int. Cl.
*H03K 19/003* (2006.01)
(52) U.S. Cl. ............... 326/30; 326/26; 326/27; 327/108
(58) Field of Classification Search ............ 326/30, 326/86, 26, 27, 83, 90; 327/108
See application file for complete search history.

(56) References Cited

U.S. PATENT DOCUMENTS

| | | | | |
|---|---|---|---|---|
| 5,955,911 A | * | 9/1999 | Drost et al. | 327/404 |
| 6,064,224 A | * | 5/2000 | Esch et al. | 326/30 |
| 6,157,206 A | * | 12/2000 | Taylor et al. | 326/30 |
| 6,356,106 B1 | * | 3/2002 | Greeff et al. | 326/30 |
| 6,414,512 B1 | * | 7/2002 | Moyer | 326/30 |
| 6,734,702 B1 | * | 5/2004 | Ikeoku et al. | 326/30 |
| 6,768,393 B1 | * | 7/2004 | Song | 333/22 R |

* cited by examiner

*Primary Examiner*—Vibol Tan

(74) *Attorney, Agent, or Firm*—Myers Bigel Sibley & Sajovec, PA

(57) ABSTRACT

A semiconductor device includes an on-chip termination circuit, a reference voltage generator, and an input buffer. The on-chip termination circuit generates a variable resistance to an input signal based on at least one code signal. The reference voltage generator generates a reference voltage based on the code signal. The input buffer generates an internal signal based on the input signal from the on-chip terminal circuit and based on the reference voltage.

18 Claims, 6 Drawing Sheets

SEMICONDUCTOR DEVICES WITH REFERENCE VOLTAGE GENERATORS AND TERMINATION CIRCUITS CONFIGURED TO REDUCE TERMINATION MISMATCH

RELATED APPLICATION

This U.S. nonprovisional patent application claims priority under 35 U.S.C. § 119 to Korean Patent Application No. 10-2003-0018471, filed on Mar. 25, 2003, in the Korean Intellectual Property Office, which is hereby incorporated herein by reference in its entirety as if set forth fully herein.

1. Field of the Invention

The present invention relates to semiconductor devices, and more particularly, to semiconductor devices that are configured to compensate for on-chip termination mismatches.

2. Background of the Invention

When signals are transmitted and received between semiconductor devices in a system, such as through buses, termination resistors may be used for impedance matching. The termination resistors may enhance signal integrity by reducing signal reflection. Termination resistors may be used inside and/or outside a semiconductor device. Termination resistors that are inside a semiconductor device can be referred to as on-chip termination resistors or on-die termination resistors.

An on-chip termination resistor can be connected to an input pin of a semiconductor device. An input buffer can covert signals that are input into the semiconductor device, through the input pin, into internal signals that are appropriate for the semiconductor device. The input buffer may compare input signals to a predetermined reference voltage to generate the internal signals. The reference voltage is generally a constant voltage level, and is applied from outside of the semiconductor device. The reference voltage should match a voltage crossing point of the input signals to avoid error in the conversion of input signals into internal signals. However, mismatch between the reference voltage and the voltage crossing point of input signals can occur due to a mismatch in the resistivity of an on-chip termination resistor.

FIG. 1 is a circuit diagram of a semiconductor device 100 that provides on-chip termination of input signals. Referring to FIG. 1, the semiconductor device 100 includes pairs of termination resistors (RU and RD) and buffers 231 and 232. Each pair of the termination resistors includes a pull-up termination resistor RU and a pull-down termination resistor RD, which are connected in series between a power supply voltage VDD and ground. The pull-up termination resistors RU have a variable resistance based on a code signal CD1, and the pull-down resistors RD have a variable resistance based on a code signal CD2. Signals IS1 and IS2 are input into the semiconductor device 100 via input pins 112 and 113, respectively, and are conducted through different respective nodes between the pairs of the pull-up termination resistors RU and the pull-down termination resistors RD. An outside reference voltage VREF is input via a pin 111 and conducted to the buffers 231 and 232. The reference voltage VREF can be half the power supply voltage VDDQ. The buffers 231 and 232 generate internal signals CS1 and CS2 based on a comparison of the input signals IS1 and IS2, respectively, to the reference voltage VREF.

When the reference voltage VREF matches the voltage crossing point of the input signals IS1 and IS2, less error may result from the conversion by the buffers 231 and 232 of the logic levels of the input signals IS1 and IS2 to those of the internal signals CS1 and CS2. Mismatch between the pull-up termination resistor RU and the pull-down termination resistor RD may cause the voltage crossing point of the input signals IS1 and IS2 to not match the reference voltage VREF. The termination resistors RU and RD may become mismatched because of a mismatch between the code signals CD1 and CD2.

SUMMARY OF THE INVENTION

Various embodiments of the invention provide a semiconductor device that includes an on-chip termination circuit, a reference voltage generator, and an input buffer. The on-chip termination circuit generates a variable resistance to an input signal based on at least one code signal. The reference voltage generator generates a reference voltage based on the code signal. The input buffer generates an internal signal based on the input signal from the on-chip terminal circuit and based on the reference voltage.

In some further embodiments of the invention, the on-chip termination circuit includes a pull-up termination resistor and a pull-down termination resistor, and the code signal includes a pull-up code signal and a pull-down code signal. The pull-up termination resistor has a variable resistance based on a pull-up code signal. The pull-down termination resistor has a variable resistance based on the pull-down code signal. The pull-up termination resistor and the pull-down termination resistor are connected in series between a first power supply voltage and a second power supply voltage. The input signal is conducted to the input buffer through a connection node between the pull-up termination resistor and the pull-down termination resistor.

In some further embodiments of the invention, the reference voltage generator includes first and second resistors. The first resistor has a variable resistance based on the pull-up code signal, and the second resistor has a variable resistance based on the pull-down code signal. The first and second resistors are connected in series between the first power supply voltage and the second power supply voltage, and the reference voltage is generated at a node between the first and second resistors. The pull-up termination resistor has the same variable resistance based on the pull-up code signal as the first resistor, and the pull-down termination resistor has the same variable resistance based on the pull-down code signal as the second resistor. The semiconductor device may further include a calibration circuit that is configured to generate the pull-up code signal and the pull-down code signal based on resistance of a resistor that is external to the semiconductor device.

In various other embodiments of the invention, a semiconductor device includes an on-chip termination circuit, a reference voltage generator, and an input buffer. The on-chip termination circuit generates a variable resistance to an input signal based on a first code signal, and includes a termination resistor that generates the variable resistance to the input signal based on the first code signal. The reference voltage generator generates a reference voltage based on a second code signal, and includes a first resistor that has a variable resistance based on the second code signal, and a second resistor that has a variable resistance based on the second code signal. The first and second resistors are connected in series between a first power supply voltage and a second power supply voltage. The reference voltage is generated at a node between the first and second resistors. The input buffer generates an internal signal based on the input signal from the on-chip terminal circuit and based on the reference voltage.

In some further embodiments of the invention, the termination resistor is connected between the first power supply voltage and a node through which the input signal is conducted to the input buffer. The semiconductor device may further include a calibration circuit that is configured to generate the first code signal and the second code signal so that the termination resistor has about the same resistance as the total of the resistance of the first resistor and the second resistor. The calibration circuit may generate the first code signal and the second code signal based on resistance of a resistor that is external to the semiconductor device. The semiconductor device may further include an input pin through which the input signal is received from external to the semiconductor device, and may include a pull-down driver which is connected between the input pin and the second power supply voltage.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when elements are referred to as being connected to one another, this connection may be direct or via one or more intervening elements. In contrast, when an element is referred to as being "directly connected" or "directly coupled" to another element, there are no intervening elements present.

Figure 2:
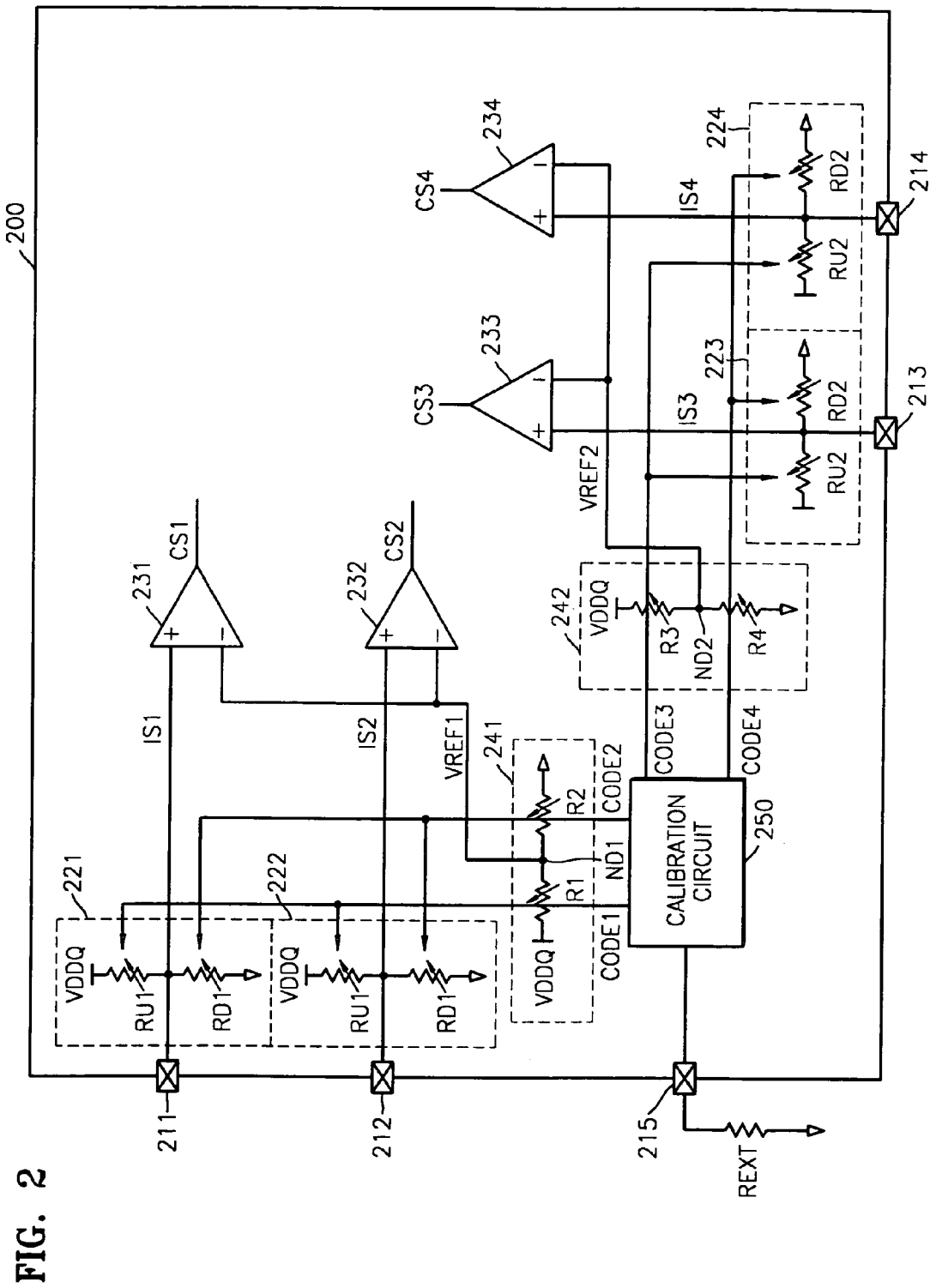
FIG. 2 is a circuit diagram of a semiconductor device according to various embodiments of the present invention.

FIG. 2 is a circuit diagram of a semiconductor device 200 according to various embodiments of the present invention. Referring to FIG. 2, the semiconductor device 200 includes a plurality of input pins 211 through 215, on-chip termination circuits 221 through 224, input buffers 231 through 234, reference voltage generators 241 and 242, and a calibration circuit 250.

External signals are input into the semiconductor device 200 through the input pins 211 through 215. The input pins 211 through 215 may also serve as output pins through which internal signals are output from the semiconductor device 200. The input pins 211 through 214 are coupled to the on-chip termination circuits 221 through 224, respectively.

Each of the on-chip termination circuits 221 and 222 includes a pull-up termination resistor RU1 and a pull-down termination resistor RD1, which are connected in series between two power supply voltages, shown as power supply voltage VDDQ and ground voltage. The pull-up termination resistors RU1 are connected to the power supply voltage VDDQ and a different one of the input pins 211 and 212, and the pull-down termination resistors RD1 are connected between a different one of the input pins 211 and 212 and the ground voltage. The pull-up termination resistor RU1 is a variable resistor whose resistance varies based on a pull-up code signal CODE1, which is output by the calibration circuit 250. The pull-down termination resistor RD1 is a variable resistor whose resistance varies based on a pull-down code signal CODE2, which is output by the calibration circuit 250. Although the pull-up termination resistors RU1 and the pull-down termination resistors RD1 are illustrated in FIG. 2 as resistors, in some embodiments of the present invention, the pull-up termination resistors RU1 and/or the pull-down termination resistors RD1 may include transistors, such as MOS transistors.

Each of the on-chip termination circuits 223 and 224 includes a pull-up termination resistor RU2 and a pull-down termination resistor RD2, which are connected in series between two power supply voltages, shown as power supply voltage VDDQ and ground voltage. The pull-up termination resistor RU2 is a variable resistor whose resistance varies based on a pull-up code signal CODE3, which is output by the calibration circuit 250. The pull-down termination resistor RD2 is a variable resistor whose resistance varies based on a pull-down code signal CODE4, which is output by the calibration circuit 250. The pull-up termination resistors RU1 and RU2 can have different resistance values, and the pull-down termination resistors RD1 and RD2 can have different resistance values.

Each of the input buffers 231 through 234 compares an input signal to a reference voltage to generate an internal signal. In particular, input buffer 231 compares input signal IS1 to a reference voltage VREF1 to generate input signal CS1. Input buffer 232 compares input signal IS2 to the reference voltage VREF1 to generate input signal CS2. Input buffer 233 compares input signal IS3 to another reference voltage VREF2 to generate input signal CS3. Input buffer 234 compares input signal IS4 to the reference voltage VREF2 to generate input signal CS4.

The reference voltage generators 241 and 242 are configured to generate the reference voltages VREF1 and VREF2, respectively. The reference voltage generators 241 and 242 can have the same resistive characteristics and structure as the on-chip termination circuits 221 through 224. For example, in some embodiments of the present invention, the reference voltage generators 241 and 242 are fabricated by the same semiconductor processes, and have the same resistive characteristics, as the on-chip termination circuits 221 through 224.

As shown in FIG. 2, there are two different types of on-chip termination circuits, one type is the on-chip termination circuits 221 and 222 that include RU1 and RD1, and the other type is the on-chip termination circuits 223 and 224 that include RU2 and RD2. In some embodiments of the present invention, two reference voltage generators are connected to different ones of the types of on-chip termination circuits.

The reference voltage generator 241 includes a first resistor R1 and a second resistor R2 that are connected in series between two power supply voltages, shown as the power supply voltage VDDQ and the ground voltage. The first resistor R1 has a resistance value which varies based on the pull-up code signal CODE1, which also controls the pull-up termination resistor RU1. The second resistor R2 has a resistance value which varies based on the pull-down code signal CODE2, which also controls the pull-down termination resistor RD1. The first and second resistors R1 and R2 may be replicas of the pull-up termination resistor RU1 and the pull-down termination resistor RD1, respectively. The reference voltage VREF1 is generated from a node ND1 between the first and second resistors R1 and R2.

The reference voltage generator 242 includes a third resistor R3 and a fourth resistor R4 that are connected in series between two power supply voltages, shown as the power supply voltage VDDQ and the ground voltage. The third resistor R3 has a resistance value which varies based on the pull-up code signal CODE3, which also controls the pull-up termination resistor RU2. The fourth resistor R4 has a resistance value which varies based on the pull-down code signal CODE4 which also controls the pull-down termination resistor RD2 The third and fourth resistors R3 and R4 may be replicas of the pull-up termination resistor RU2 and the pull-down termination resistor RD2, respectively. The reference voltage VREF2 is generated from a node ND1 between the third and fourth resistors R3 and R4.

The calibration circuit 250 generates the pull-up code signals CODE1 and CODE3 and pull-down code signals CODE2 and CODE4 based on resistance of an external resistor REXT that is external to the semiconductor device. The external resistor REXT is connected between the input pin 215 and the ground voltage. The external resistor REXT is outside the semiconductor device 200 so that a user can vary the resistance of on-chip termination resistors RU1, RD1, RU2, and RD2. However, in some embodiments, the resistor REXT may be inside the semiconductor device. The calibration circuit 250 generates the code signals CODE1 through CODE4 based on the resistor REXT to control the on-chip termination resistors RU1, RD1, RU2, and RD2 to have a predetermined resistance value.

In various embodiments of the present invention, the reference voltage generator 241 has the same electrical characteristics and structure as the on-chip termination circuits 221 and 222. Additionally, the reference voltage generator 242 has the same electrical characteristics and structure as the on-chip termination circuits 223 and 224. For example, the pull-up termination resistors RU1 and RU2 have the same resistance values as the first resistor R1 and the third resistor R3, respectively, based on the pull-up code signals CODE1 and CODE 3, respectively. The pull-down termination resistors RD1 and RD2 have the same resistance values as the second resistor R2 and the fourth resistor R4, respectively, based on the pull-down code signals CODE2 and CODE 4, respectively.

Consequently, when a mismatch occurs between the pull-up termination resistor RU1 and the pull-down termination resistor RD1 of each of the on-chip termination circuits 221 and 222, a mismatch also occurs between the first and second resistors R1 and R2 of the reference voltage generator 241. Accordingly, the mismatch between the pull-up and pull-down termination resistors RU1 and RD1 of each of the on-chip termination circuits 221 and 222 may be at least partially compensated for by the mismatch between the first and second resistors R1 and R2 of the reference voltage generator 241.

Similarly, when a mismatch occurs between the pull-up termination resistor RU2 and the pull-down termination resistor RD2 of each of the on-chip termination circuits 223 and 224, a mismatch also occurs between the first and second resistors R3 and R4 of the reference voltage generator 242. Accordingly, the mismatch between the pull-up and pull-down termination resistors RU2 and RD2 of each of the on-chip termination circuits 223 and 224 may be at least partially compensated for by the mismatch between the third and fourth resistors R3 and R4 of the reference voltage generator 242.

Although the semiconductor device shown in FIG. 2 shows two different types of on-chip termination circuits 221–222 and 223–224 and two different types of reference voltage generators 241 and 242, these circuits and generators are provided for illustration purposes only. Some embodiments of the present invention can include more or less on-chip termination circuits and/or reference voltage generators, and the number of code signals that are generated by the calibration circuit 250 may vary accordingly.

Figure 4A:
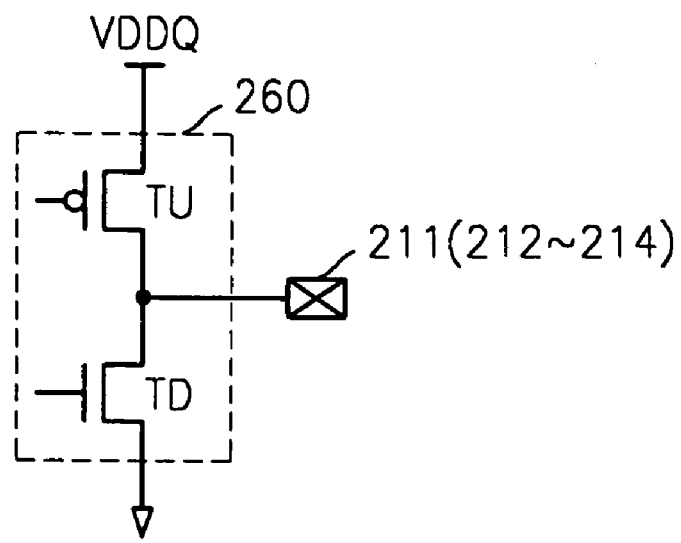
FIGS. 4A and 4B are circuit diagrams of a push-pull driver and an output driver having an open drain structure, respectively, according to various embodiments of the present invention.

The semiconductor device 200 may further include an output driver that is configured as a push-pull circuit and that is coupled to output pins. FIG. 4A shows a push-pull driver 260 according to various embodiments of the present invention. The push-pull driver 260 may be connected to, for example, the input pins 211, 212, 213, or 214 shown in FIG. 2. The push-pull driver 260 includes a pull-up driver TU, connected between the power supply voltage VDDQ and one of the input pins 211, 212, 213, or 214, and a pull-down driver TD connected between the same one of the input pins 211, 212, 213, or 214 and the ground voltage. When the output driver has a push-pull configuration, the output driver may be used with the on-chip termination circuits 221 through 224 (shown in FIG. 2), including the pull-up termination resistors RU1 and RU2 and the pull-down termination resistors RD1 and RD2. Additionally, the reference voltage generators 241 and 242 may be configured as was described above.

Figure 3:
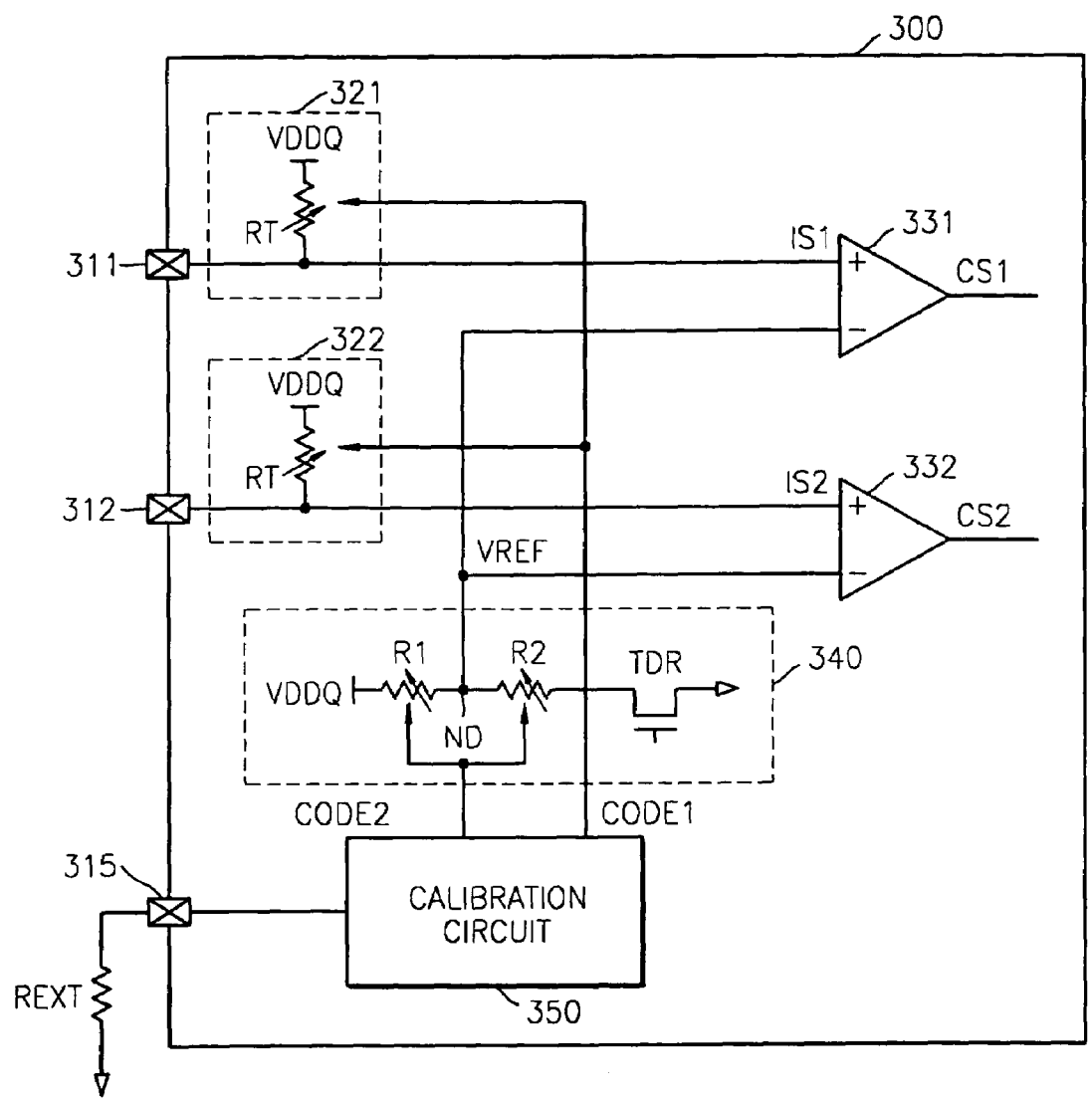
FIG. 3 is a circuit diagram of a semiconductor device according to various other embodiments of the present invention.

FIG. 3 is a circuit diagram of a semiconductor device 300 according to various other embodiments of the present invention. Referring to FIG. 3, the semiconductor device 300 includes a plurality of input pins 311 and 312, on-chip termination circuits 321 and 322, input buffers 331 and 332, a reference voltage generator 340, and a calibration circuit 350. The input pins 312 and 312 are connected to the on-chip termination circuits 321 and 322, respectively.

Each of the on-chip termination circuits 321 and 322 includes a termination resistor RT that is connected between a power supply voltage VDDQ and a node through which one of the input signals IS1 and IS2 are conducted from the input pins 311 and 312 to the input buffers 331 and 332. The termination resistor RT has a resistance value that varies based on a first code signal CODE1. The first code signal CODE1 is generated by the calibration circuit 350.

The input buffer 331 generates an internal signal CS1 based on the input signal IS1 and a reference voltage VREF. The input buffer 332 generates an internal signal CS2 responsive to the input signal IS2 and the reference voltage VREF.

The reference voltage generator 340 generates the reference voltage VREF. The reference voltage generator 340 includes first and second resistors R1 and R2 and a reference voltage driver TDR, which are connected in series between two power supply voltages, shown as a power supply voltage VDDQ and a ground voltage. The resistance of each of the first and second resistors R1 and R2 may be half the resistance of the termination resistor RT, so that the resistance of the termination resistor RT is the sum of the resistance of the first and second resistors R1 and R2. The resistance of the first and second resistors R1 and R2 varies based on a second code signal CODE2, which is generated by the calibration circuit 350. The calibration circuit 350 may generate the second code signal CODE2 and/or the first code signal CODE1 so that the resistance of each of the first and second resistors R1 and R2 have half of the resistance of the termination resistor RT.

Figure 4B:
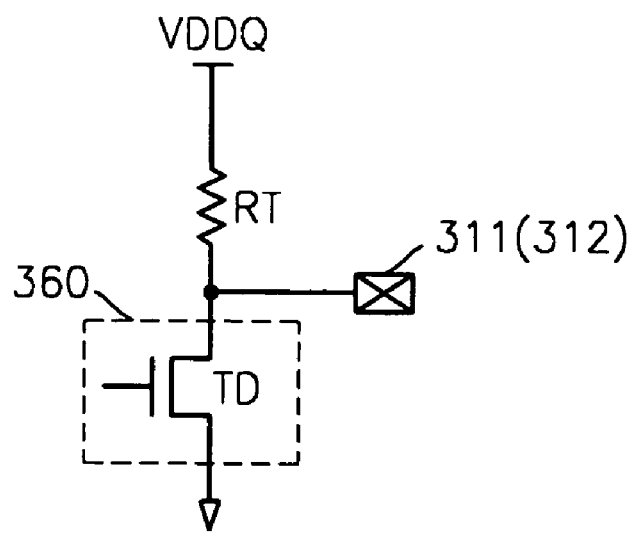

The semiconductor device 300 may further include an output driver 360 that has an open-drain structure, as shown in FIG. 4B. The output driver 360 may be connected to the input pins 311 or 312, which may also function as output pins. The output driver 360 includes a pull-down driver TD, which is connected between the input pin 311 or 312 and the ground voltage. The reference voltage driver TDR may have the same characteristics of the pull-down driver TD in the output driver 360.

The reference voltage VREF is generated from a node ND between the first and second resistors R1 and R2. The reference voltage VREF from the reference voltage generator 340 may be defined by the following equation.

$$VREF = VDDQ - \left(\frac{VDDQ - VOL}{2}\right) \quad (1)$$

In Equation (1), VOL indicates a low voltage level of the input signal IS1 or IS2.

The voltage of the input signals IS1 and IS2 swings between the power supply voltage level VDDQ and the low voltage level VOL. The equation $$\left(\frac{VDDQ - VOL}{2}\right)$$

represents half of the width of the voltage variation range of the input signals IS1 and IS2. Therefore, the reference voltage VREF corresponds to a median voltage level between the power supply voltage level VDDQ and the low voltage level VOL.

The calibration circuit 350 generates the code signals CODE1 and CODE2 based on the resistance of the an external resistor REXT, which is external to the semiconductor device 300 and connected thereto via pin 315. Although only one reference voltage generator 340 is shown in FIG. 3, according to some embodiments of the present invention, more than one reference voltage generator may be used based on, for example, the number of different types of characteristics of on-chip termination circuits in a semiconductor device.

As described above, resistors R1 and R2 of the reference voltage generator 340 may have the same electrical characteristics as the termination resistor RT in the on-chip termination circuits 321 and 322. Consequently, if the resistance of the termination resistor RT of the on-chip termination circuits 321 and 322 deviates from a desired resistance value, i.e., there is an error between the desired resistance value and the resistance of the termination resistor RT, the first and second resistors R1 and R2 of the reference voltage generator 340 may have a corresponding error. Accordingly, the resistivity error in the on-chip termination circuits 321 and 322 may be compensated for by the resistivity error in the reference voltage generator 340.

As described above, reference voltages are generated by a reference voltage generator in a semiconductor device, and are used by input buffers to generate internal signals. In some embodiments of the present invention, a reference voltage may be supplied to an input buffer, such as the buffers 231–234 of FIG. 2 and/or the buffers 331–332 of FIG. 3, from external to the semiconductor device instead of, or in addition to, being generated on-chip by a reference voltage generator. In still other embodiments of the present invention, a semiconductor device selectively provides either a reference voltage that is received from outside the semiconductor device or a reference voltage that is generated internal to the semiconductor device.

Figure 1:
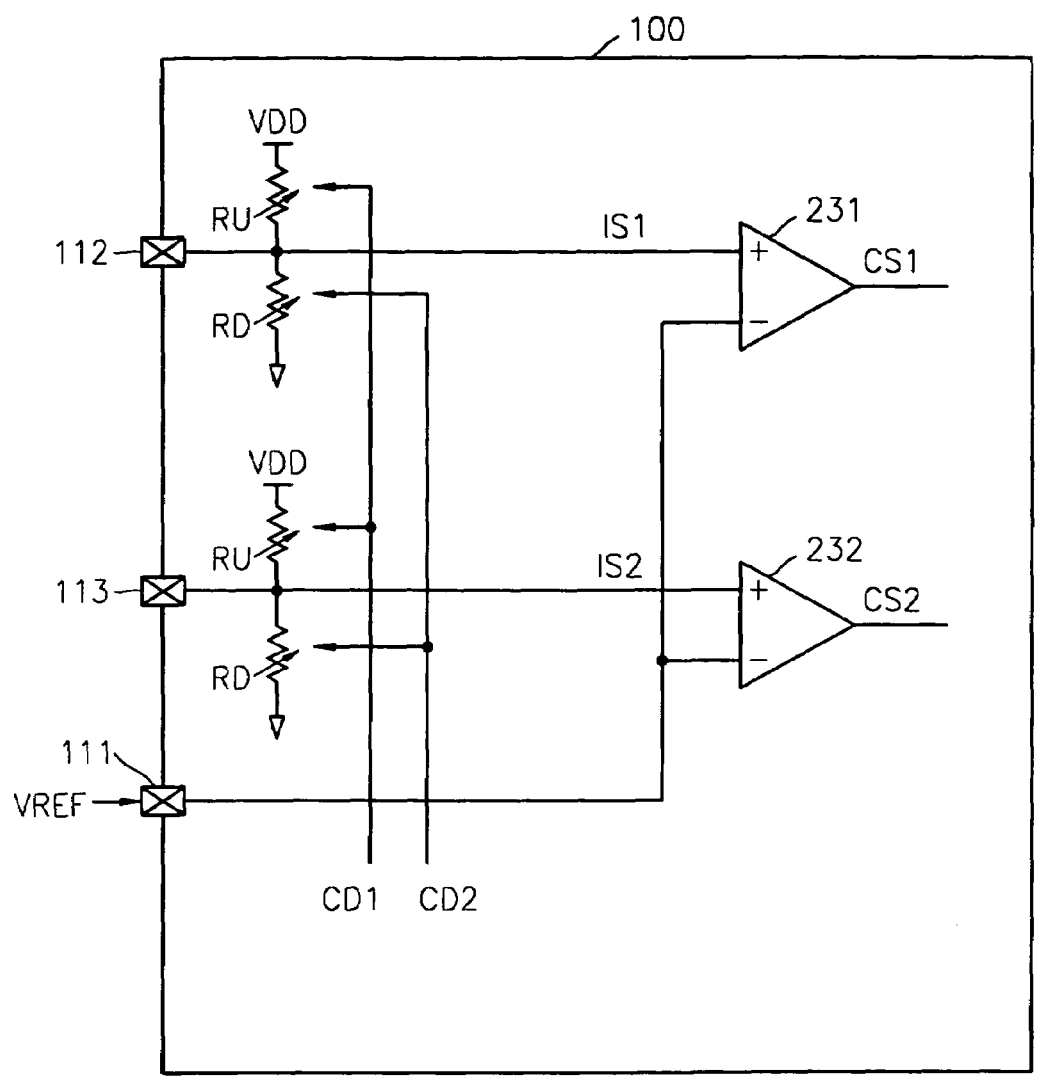
FIG. 1 is a circuit diagram of a conventional semiconductor device.

FIGS. 5A through 5D are waveform diagrams of signals that are input into the semiconductor devices that are shown in FIGS. 1 and 2. The resistances of the pull-up termination resistors RU (in FIG. 1) and RU1 (in FIG. 2) and the pull-down termination resistors RD (in FIG. 1) and RD1 (in FIG. 2) are set by the corresponding code signals to 120 Ω, the power supply voltage VDDQ is 1.8 V, and an external reference voltage VREF_EXT is received from the outside the semiconductor device and is equal to $$\frac{VDDQ}{2}$$

(i.e., 0.9 V).

Figure 5A:
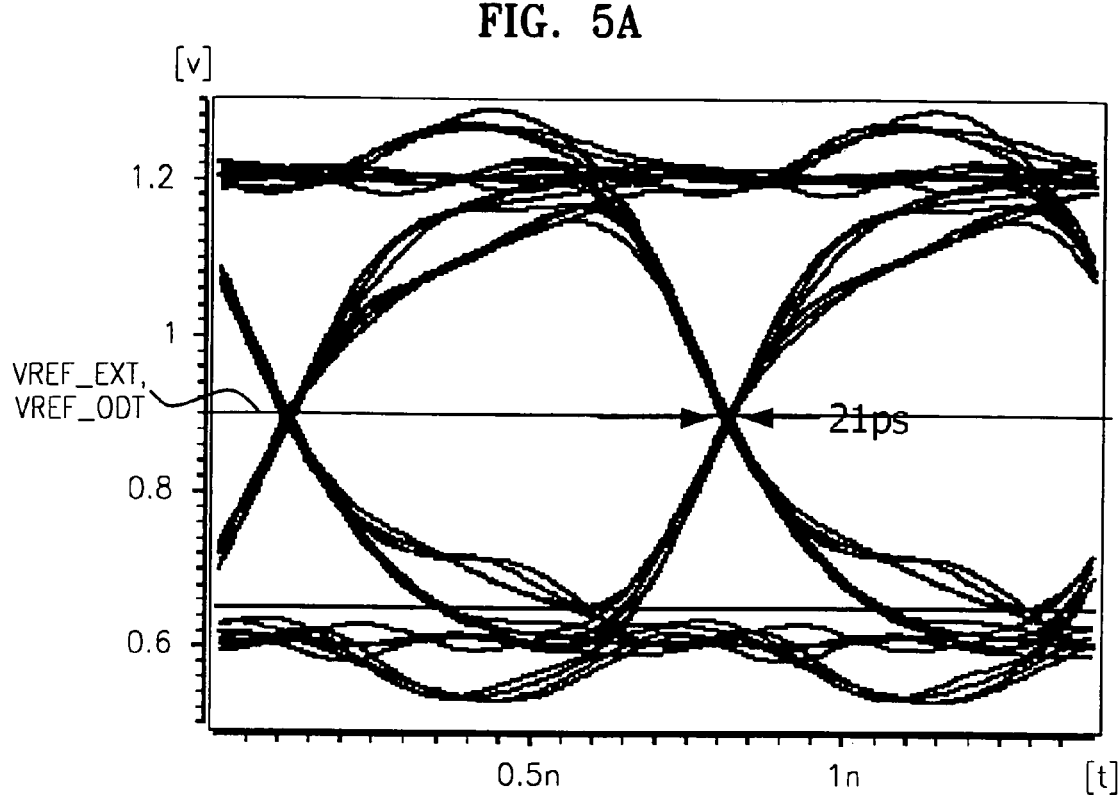
FIGS. 5A through 5D are waveform diagrams of signals that are input into the semiconductor devices shown in FIGS. 1 and 2.

FIG. 5A illustrates the input signal waveforms when the resistances of the pull-up termination resistors RU (in FIG. 1) and RU1 (in FIG. 2) and the pull-down termination resistors RD (in FIG. 1) and RD1 (in FIG. 2) are set to a desirable resistance level, i.e., 120 Ω.

Figure 5B:
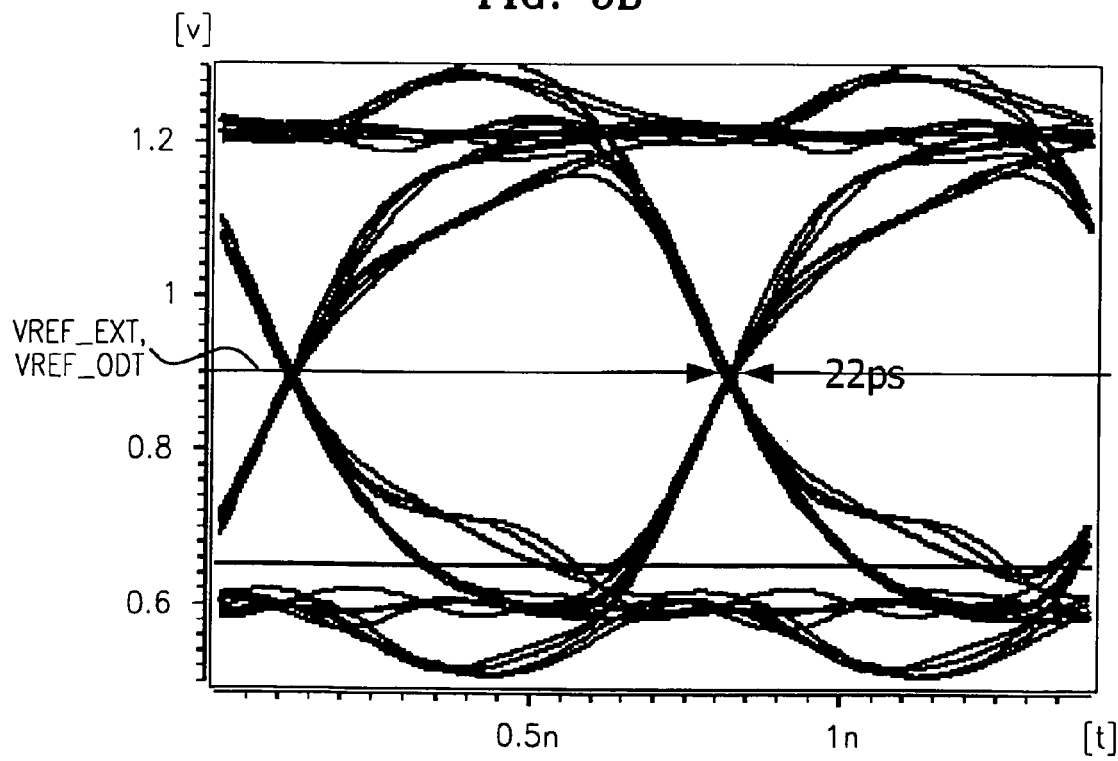

FIG. 5B illustrates the input signal waveforms when the resistances of the pull-up termination resistors RU (in FIG. 1) and RU1 (in FIG. 2) and the pull-down termination resistors RD (in FIG. 1) and RD1 (in FIG. 2) are set to 132 Ω, which is 10% greater than the desirable resistance level.

Figure 5C:
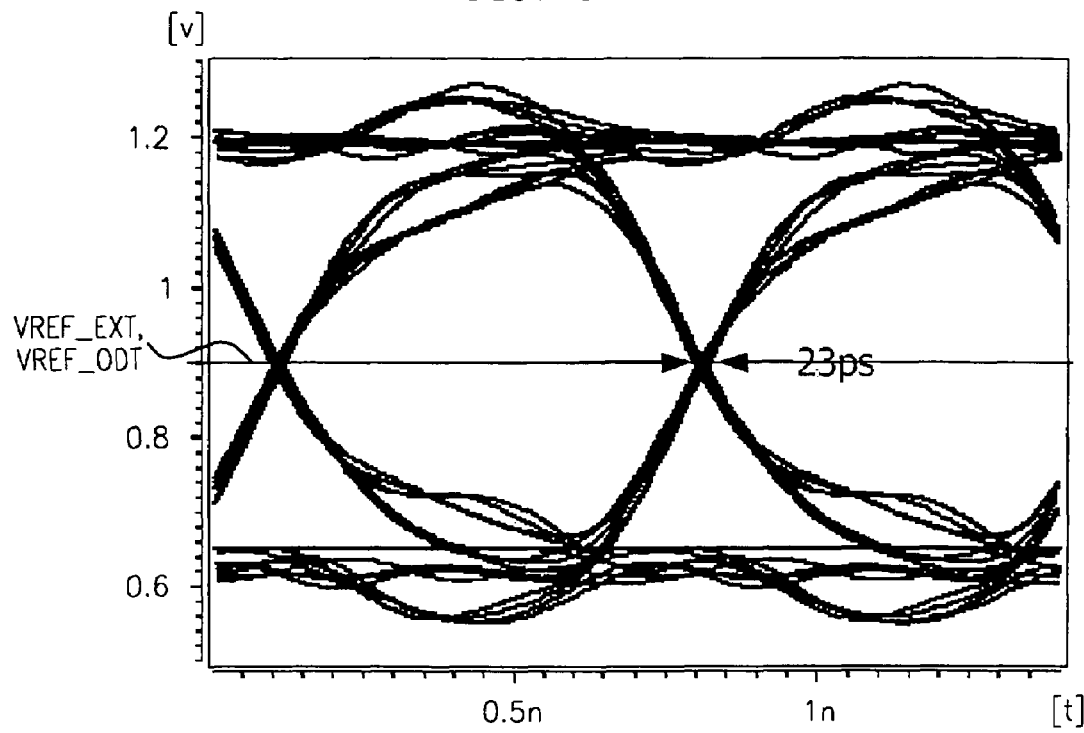

FIG. 5C illustrates the input signal waveforms when the resistances of the pull-up termination resistors RU (in FIG. 1) and RU1 (in FIG. 2) and the pull-down termination resistors RD (in FIG. 1) and RD1 (in FIG. 2) are set to 108 Ω, which is 10% less than the desirable resistance level.

As shown in FIGS. 5A through 5C, signals input into the semiconductor devices of FIGS. 1 and 2 have the same waveforms. In addition, a reference voltage (referred to as an internal reference voltage VREF_ODT), which is generated from one of the reference voltage generators 241 and 242 in the semiconductor device 200 of FIG. 2, may be almost equal to the external reference voltage VTRF_EXT (i.e., about 0.9 V).

Figure 5D:
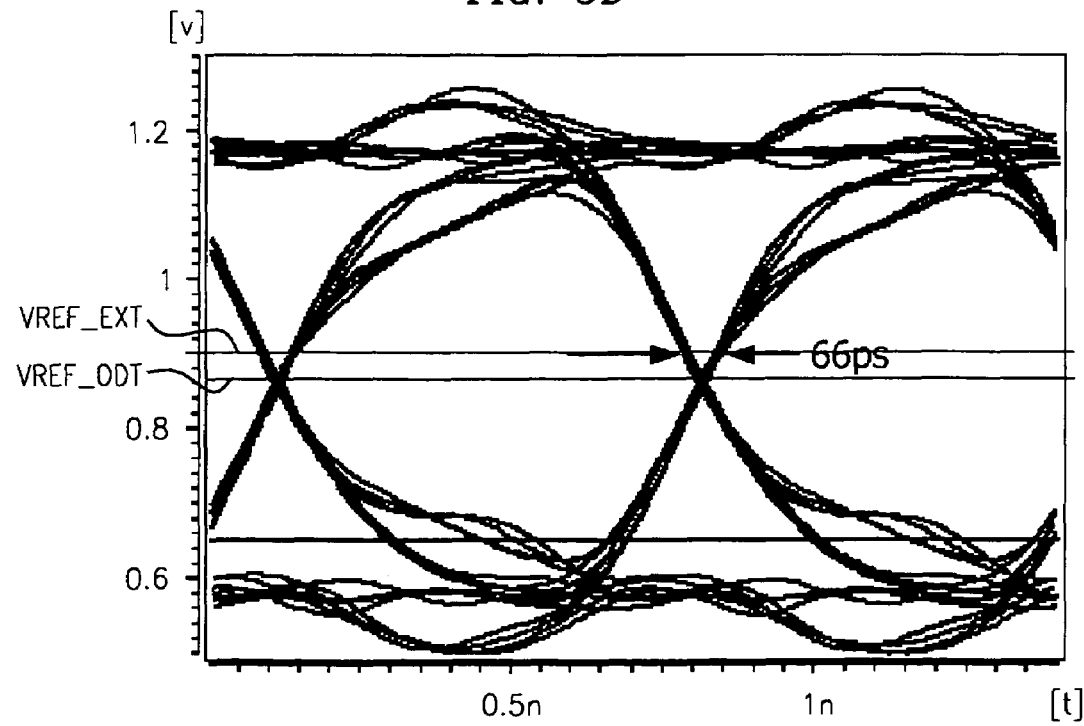

FIG. 5D illustrates the input signal waveforms when the resistances of the pull-up termination resistors RU (in FIG. 1) and RU1 (in FIG. 2) and the pull-down termination resistors RD (in FIG. 1) and RD1 (in FIG. 2) are set to 132 Ω and 108 Ω, respectively, and thus a mismatch occurs. As shown in FIG. 5D, input signals cross each other at a voltage of about 0.876 V. Although the external reference voltage VREF_EXT is maintained at the same level (i.e., 0.9 V), as was done with respect to FIGS. 5A through 5C, the internal reference voltage VREF_ODT is maintained at 0.872 V, which is nearly equal to the cross point voltage 0.876 V. In this situation, the conventional semiconductor device 100 of FIG. 1 may have a signal skew of about 66 ps because the internal signals are generated based on the input signals and based on the reference voltage, which has deviated from the voltage crossing point. In contrast, the semiconductor device according to some embodiments of the present invention, as shown in FIG. 2, generates the internal signals based on the input signals and based on a reference voltage, which is nearly equal to the voltage crossing point of the input signals, thus reducing the skew by as much as 45 ps.

Thus, resistivity error and mismatch between on-chip termination resistors may be automatically compensated, and error in the input signals and associated internal signals may be reduced.

In the drawings and specification, there have been disclosed various embodiments of the invention and, although specific terms are employed, they are used in a generic and descriptive sense only and not for purposes of limitation, the scope of the invention being set forth in the following claims. Although the invention has been described with reference to particular embodiments, it will be apparent to one of ordinary skill in the art that modifications of the described embodiments may be made without departing from the spirit and scope of the invention.

What is claimed is:

1. A semiconductor device, comprising:
    an on-chip termination circuit that is configured to generate a variable resistance to an input signal based on at least one code signal;
    a reference voltage generator that is configured to generate a reference voltage based on the at least one code signal; and
    an input buffer that is configured to generate an internal signal based on the input signal from the on-chip terminal circuit and the reference voltage, wherein the on-chip termination circuit comprises a termination resistor that is configured to generate a variable resistance to the input signal based on a first code signal.

2. The semiconductor device of claim 1, wherein the at least one code signal comprises a pull-up code signal and a pull-down code signal, and wherein the on-chip termination circuit comprises:
    a pull-up termination resistor that is configured to have a variable resistance based on the pull-up code signal; and
    a pull-down termination resistor that is configured to have a variable resistance based on the pull-down code signal, wherein the pull-up termination resistor and the pull-down termination resistor are connected in series between a first power supply voltage and a second power supply voltage, and wherein the input signal is conducted through a connection node between the pull-up termination resistor and the pull-down termination resistor.

3. The semiconductor device of claim 2, wherein the reference voltage generator comprises:
    a first resistor that is configured to have a variable resistance based on the pull-up code signal; and
    a second resistor that is configured to have a variable resistance based on the pull-down code signal, wherein the first and second resistors are connected in series between the first power supply voltage and the second power supply voltage, and wherein the reference voltage is generated at a node between the first and second resistors.

4. The semiconductor device of claim 3, wherein:
    the pull-up termination resistor has the same variable resistance based on the pull-up code signal as the first resistor; and
    the pull-down termination resistor has the same variable resistance based on the pull-down code signal as the second resistor.

5. The semiconductor device of claim 2, further comprising a calibration circuit that is configured to generate the pull-up code signal and the pull-down code signal based on resistance of an external resistor that is external to the semiconductor device.

6. The semiconductor device of claim 1, wherein the termination resistor is connected between a power supply voltage and a node through which the input signal is conducted to the input buffer.

7. The semiconductor device of claim 1, wherein the reference voltage generator is configured to generate the reference voltage based on an external reference voltage signal that is received from external to the semiconductor device.

8. The semiconductor device of claim 1, further comprising:
    a plurality of input pins, wherein each of the input pins is configured to receive a different input signal;
    a plurality of the on-chip termination circuits, wherein each of the on-chip termination circuits is coupled to a different one of the input pins and is configured to generate a variable resistance to a respective one of the input signals from the input pins based on different ones of a plurality of code signals;
    a plurality of the reference voltage generators, wherein each of the reference voltage generators is paired with at least one of the plurality of the on-chip termination circuits, and is configured to generate a reference voltage based on the same one of the plurality of code signals as the paired on-chip termination circuit; and
    a plurality of input buffers, wherein each of the input buffers is configured to receive the input signal and the reference voltage from a different pair of the on-chip termination circuits and the reference voltage generators, and is configured to convert the received input signal into an internal signal.

9. A semiconductor device, comprising:
    an input pin that is configured to receive an input signal from external to the semiconductor device;
    an on-chip termination circuit that comprises a pull-up termination resistor and a pull-down termination resistor, wherein the pull-up termination resistor and the pull-down termination resistor are connected in series between a first power supply voltage and a second power supply voltage, and wherein the input signal is conducted through a connection node between the pull-up termination resistor and the pull-down termination resistor;
    a reference voltage generator that comprises a first resistor and a second resistor, wherein the first and second resistors are connected in series between the first power supply voltage and the second power supply voltage, and wherein the reference voltage is generated at a node between the first and second resistors; and
    an input buffer that is configured to generate an internal signal based on the input signal from the on-chip terminal circuit and the reference voltage, wherein:
    the pull-up termination resistor has the same resistance as the first resistor;
    the pull-down termination resistor has the same resistance as the second resistor;
    the pull-up termination resistor is configured to have a variable resistance based on a pull-up code signal;
    the first resistor is configured is configured to have a variable resistance based on the pull-up code signal;
    the pull-down termination resistor is configured to have a variable resistance based on a pull-down code signal; and the second resistor is configured to have a variable resistance based on a pull-down code signal.

10. The semiconductor device of claim 9, wherein:
the pull-up termination resistor and the first resistor are configured to have the same variable resistance based on the pull-up code signal; and
the pull-down termination resistor and the second resistor are configured to have the same variable resistance based on the pull-down code signal.

11. The semiconductor device of claim 9, further comprising a calibration circuit that is configured to generate the pull-up code signal and the pull-down code signal based on resistance of an external resistor that is external to the semiconductor device.

12. A semiconductor device, comprising:
an on-chip termination circuit that is configured to generate a variable resistance to an input signal based on a first code signal, wherein the on-chip termination circuit comprises a termination resistor that is configured to generate the variable resistance to the input signal based on the first code signal;
a reference voltage generator that is configured to generate a reference voltage based on a second code signal, wherein the reference voltage generator comprises a first resistor that is configured to have a variable resistance based on the second code signal, and a second resistor that is configured to have a variable resistance based on the second code signal, wherein the first and second resistors are connected in series between a first power supply voltage and a second power supply voltage, and wherein the reference voltage is generated at a node between the first and second resistors; and
an input buffer that is configured to generate an internal signal based on the input signal from the on-chip terminal circuit and based on the reference voltage.

13. The semiconductor device of claim 12, wherein the termination resistor is connected between the first power supply voltage and a node through which the input signal is conducted to the input buffer.

14. The semiconductor device of claim 12, wherein the termination resistor has a resistance that is about the same as the total resistance of the first resistor and the second resistor.

15. The semiconductor device of claim 12, further comprising a calibration circuit that is configured to generate the first code signal and the second code signal so that the termination resistor has twice the resistance as the first resistor and the second resistor.

16. The semiconductor device of claim 12, further comprising a calibration circuit that is configured to generate the first code signal and the second code signal based on resistance of an external resistor that is external to the semiconductor device.

17. The semiconductor device of claim 12, wherein the reference voltage generator further comprises a reference voltage driver connected in series between the second supply voltage and both of the first and second resistors.

18. The semiconductor device of claim 12, further comprising:
an input pin through which the input signal is received from external to the semiconductor device; and
a pull-down driver which is connected between the input pin and the second power supply voltage.

* * * * *